US008099226B2

(12) United States Patent
Ahn

(10) Patent No.: US 8,099,226 B2
(45) Date of Patent: Jan. 17, 2012

(54) THROTTLE COMPENSATION FOR SECOND GEAR STARTS IN MANUAL TRANSMISSION VEHICLES

(75) Inventor: Samuel S. Ahn, Torrance, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 256 days.

(21) Appl. No.: 12/614,322

(22) Filed: Nov. 6, 2009

(65) Prior Publication Data

US 2011/0112743 A1 May 12, 2011

(51) Int. Cl.
*G06F 19/00* (2011.01)

(52) U.S. Cl. ........................................ 701/103

(58) Field of Classification Search .................. 701/102, 701/103, 104, 22; 477/101, 102; 180/197
See application file for complete search history.

(56) References Cited

U.S. PATENT DOCUMENTS 4,930,078 A 5/1990 Dunkley et al.
5,067,578 A * 11/1991 Shirata et al. ................ 180/197
5,385,515 A 1/1995 Chan et al.
5,415,604 A 5/1995 Bates et al.
5,506,771 A 4/1996 Chan et al.
5,527,237 A 6/1996 Fowler et al.
5,577,978 A 11/1996 Stasik et al.
5,636,120 A 6/1997 Yesel et al.
5,646,842 A 7/1997 Schulz et al.
5,662,548 A * 9/1997 Mori ............................ 477/114
5,758,302 A 5/1998 Schulz et al.
5,761,628 A 6/1998 Steeby et al.
5,765,657 A * 6/1998 Fukumura et al. ............ 180/197
5,875,410 A 2/1999 Fowler et al.
6,014,603 A 1/2000 LeVan
6,093,974 A * 7/2000 Tabata et al. ................ 290/40 R
6,213,911 B1 4/2001 Salecker et al.
6,383,116 B1 5/2002 Warren et al.
6,620,076 B1 * 9/2003 Kawamura et al. ........... 477/107
7,089,096 B2 8/2006 Liebl et al.
7,302,333 B2 11/2007 Steen et al.
7,349,776 B2 3/2008 Spillane et al.
7,392,721 B2 7/2008 Pollak et al.
2001/0022245 A1 * 9/2001 Rogg ........................... 180/65.2
2002/0077781 A1 6/2002 Liebl et al.
2004/0014564 A1 * 1/2004 Jager et al. .................... 477/115
2004/0142793 A1 * 7/2004 Boll et al. ....................... 477/77
2005/0171678 A1 * 8/2005 Takahashi et al. ............ 701/104
2005/0283298 A1 12/2005 Ochi et al.
2008/0215214 A1 9/2008 Matsubara et al.
2010/0138086 A1 * 6/2010 Imamura et al. ................ 701/22
2010/0174473 A1 * 7/2010 Pursifull et al. .............. 701/112
2011/0112743 A1 * 5/2011 Ahn ............................. 701/103
2011/0127095 A1 * 6/2011 Imamura et al. ......... 180/65.285

FOREIGN PATENT DOCUMENTS

GB 2 302 377 1/1997
JP 61-253230 11/1986
JP 2004-116760 4/2004
JP 2007-40439 2/2007
WO WO 02/04242 1/2002

* cited by examiner

*Primary Examiner* — Stephen K Cronin
*Assistant Examiner* — Arnold Castro
(74) *Attorney, Agent, or Firm* — Brinks Hofer Gilson & Lione

(57) ABSTRACT

A system and method for throttle control during a second gear start in a vehicle with a manual transmission. A powertrain control module (PCM) is coupled to a throttle and is configured to control movement of the throttle according to a winter mode e-throttle map that is stored in the PCM. The PCM is configured to control the throttle based upon the winter mode e-throttle map upon detection of a second gear start condition.

22 Claims, 5 Drawing Sheets

THROTTLE COMPENSATION FOR SECOND GEAR STARTS IN MANUAL TRANSMISSION VEHICLES

BACKGROUND

1. Field of the Invention

The present invention generally relates to throttle control systems, and more particularly to systems and methods that implement an alternate mode throttle map under certain conditions, particularly low traction conditions.

2. Description of Related Art

The initial start and acceleration of a vehicle can be difficult in low traction conditions, conditions created when a driving surface has a low coefficient of friction, such as one coated with rain, snow, sleet, hail, or any other type of precipitation. If a driver initially starts and accelerates a vehicle in first gear, such conditions may cause the vehicle to slip because of too much torque being applied to the wheels.

Some vehicles with automatic transmissions assist the driver during the initial start and acceleration in low traction conditions. These automatic transmissions do this by automatically activating a winter mode logic or allowing the driver to manually activate a winter mode logic. When active, the winter mode logic will start out a vehicle with reduced torque multiplication through the transmission. In this manner, the vehicle can maintain better traction because less torque is being applied to the wheels.

Drivers of vehicles with manual transmissions, however, are forced to manually start in first gear or to try and start out in second gear during low traction conditions in order to reduce wheel slippage. However, with a manual transmission, the necessary throttle input for a smooth start is different if the vehicle starts in second gear versus first gear. This can result in difficulty in starting smoothly and can cause damage to the clutch system (due to excessive slip between friction elements) and to the vehicle's engine (by stalling or lugging the engine).

SUMMARY

In overcoming the drawbacks and other limitations of the related art, the present invention provides a system and method for throttle control in vehicles with manual transmissions.

The present invention assists a driver in low traction conditions by activating a winter throttle map during low traction conditions and when a non-first gear is used during an initial start and acceleration. The winter mode throttle map allows the driver to implement a similar amount of actual accelerator pedal input for a non-first gear start, as would be required for a normal first gear start, and still experience a smooth and predictable takeoff.

In one aspect, the present invention includes a method for controlling a throttle during a non-first gear start in a manual transmission vehicle. The method comprises the steps of: storing a base gear e-throttle map in a control module of the vehicle; the base gear e-throttle map defining a first relationship between an accelerator pedal application percentage and a throttle opening percentage; storing a winter mode e-throttle map in the control module of the vehicle; the winter mode e-throttle map defining a second relationship between an accelerator pedal application percentage and a engine throttle opening percentage, the winter mode e-throttle map being different than the base gear e-throttle map; determining a second gear start condition; and opening the throttle of the vehicle in response to accelerator pedal position, the opening of the throttle being based upon the second relationship defined by the winter mode e-throttle map.

In another aspect, the method determines the transmission gear position.

In another aspect, the method determines if the transmission gear position is second gear.

In a further aspect, the determining step includes the step of manually placing the transmission of the vehicle in second gear.

In an additional aspect, the determining step detects the speed of the vehicle.

In an additional aspect, the determining step detects the speed of the vehicle relative to a threshold value.

In yet another aspect, the determining step detects accelerator pedal application percentage.

In yet another aspect, the determining step detects whether the accelerator pedal application percentage is greater than zero.

In still a further aspect, the determining step detects clutch position of the vehicle.

In still a further aspect, the determining step detects the clutch position of the vehicle as being disengaged or as being engaged.

In another aspect, the determining step detects a transmission gear position of the vehicle as being in second gear, and at least one of a vehicle speed being lower than a threshold value, an accelerator pedal application position being equal to zero, and a clutch engagement status as being disengaged.

In a further aspect, the invention additionally comprising a step of sensing low traction conditions and switching from a base driving mode to a winter driving mode in response thereto, the sensing step being performed at least in part by a traction control system.

In an additional aspect, the step of sensing low traction conditions senses ambient temperature outside of the vehicle.

In yet another aspect, the step of sensing low traction conditions senses moisture outside of the vehicle.

In still a further aspect, the opening the throttle switches from being based upon the second relationship defined by the winter mode e-throttle map to being based upon the first relationship defined by the base gear e-throttle map.

In an additional aspect, the opening the throttle switches from being based upon the second relationship defined by the winter mode e-throttle map to being based on the first relationship defined by the base gear e-throttle map upon detection of the transmission gear position being in a gear other than second gear.

In another aspect, the opening the throttle switches from being based upon the second relationship defined by the winter mode e-throttle map to being based on the first relationship defined by the base gear e-throttle map upon a winter mode switch being moved to an OFF position, wherein the winter mode switch is switchable between an ON position and the OFF position.

In a further aspect, the winter mode e-throttle map defines a engine throttle opening percentage that is greater than a base gear e-throttle opening percentage defined by the base gear throttle map for a common accelerator pedal application percentage.

In another aspect, the present invention is a throttle control system in an automotive vehicle. The throttle control system comprises an engine coupled to a manual transmission; a throttle coupled to the engine and being moveable between a fully open position and a fully closed position; a powertrain control module (PCM) coupled to the throttle and configured to control movement of the throttle between the fully open position and the fully closed position; the PCM having stored in memory a base gear e-throttle map, the base gear e-throttle map defining a first relationship between an accelerator pedal application percentage and a throttle opening percentage, the PCM also having stored in memory a winter mode e-throttle map, the winter mode e-throttle map defining a second relationship between an accelerator pedal application percentage and a engine throttle opening percentage, the winter mode e-throttle map being different than the base gear e-throttle map; and the PCM being configured to determine existence of a second gear start condition and being further configured to control the throttle via the winter mode throttle map based upon a determination of the existence of the second gear start condition.

In a further aspect, a vehicle speed sensor is coupled to the PCM and configured to provide a vehicle speed signal to the PCM, the PCM being configured to determine existence of the second gear start condition based at least in part on the vehicle speed signal.

In another aspect, a clutch engagement sensor is coupled to the PCM and configured to provide a clutch engagement signal to the PCM, the PCM being configured to determine existence of the second gear start condition based at least in part on the clutch engagement signal.

In an additional aspect, an accelerator position is sensor coupled to the PCM and configured to provide an accelerator position signal to the PCM, the PCM being configured to determine existence of the second gear start condition based at least in part on the accelerator position signal.

In still another aspect, a gear position sensor coupled to the PCM and configured to provide a gear position signal to the PCM, the PCM being configured to determine existence of the second gear start condition based at least in part on the gear position signal.

In yet a further aspect, a manual winter mode switch coupled to the PCM and moveable between ON and OFF positions, the PCM being configured to control the throttle via the winter mode throttle map only when the manual winter mode switch is in the ON position.

In an additional aspect, a limited traction determining device coupled to the PCM, the limited traction determining device being configured to detect when the automotive vehicle is in a low traction condition, the PCM being configured to control the throttle via the winter mode throttle map only when the limited traction determining device detects a low traction condition.

In still a further aspect, the limited traction detecting device includes at least one of a temperature sensor and a moisture sensor.

Further objects, features and advantages of this invention will become readily apparent to persons skilled in the art, after a review of the following description, and with reference to the drawings and claims that are appended to and form a part of this specification.

DETAILED DESCRIPTION

In the following detailed description, various details are illustrated for purposes of explanation and to provide a more comprehensive account of the present invention. However, these particular details may not be necessary to practice the present invention. In other examples, well-known details and devices are shown in diagram form to effectively describe the particular embodiments presented in the present application. It will be apparent to those skilled in the art that many variations in design and use are possible for the present throttle control system and method, as well as embodiments suitable for other applications.

Figure 1:
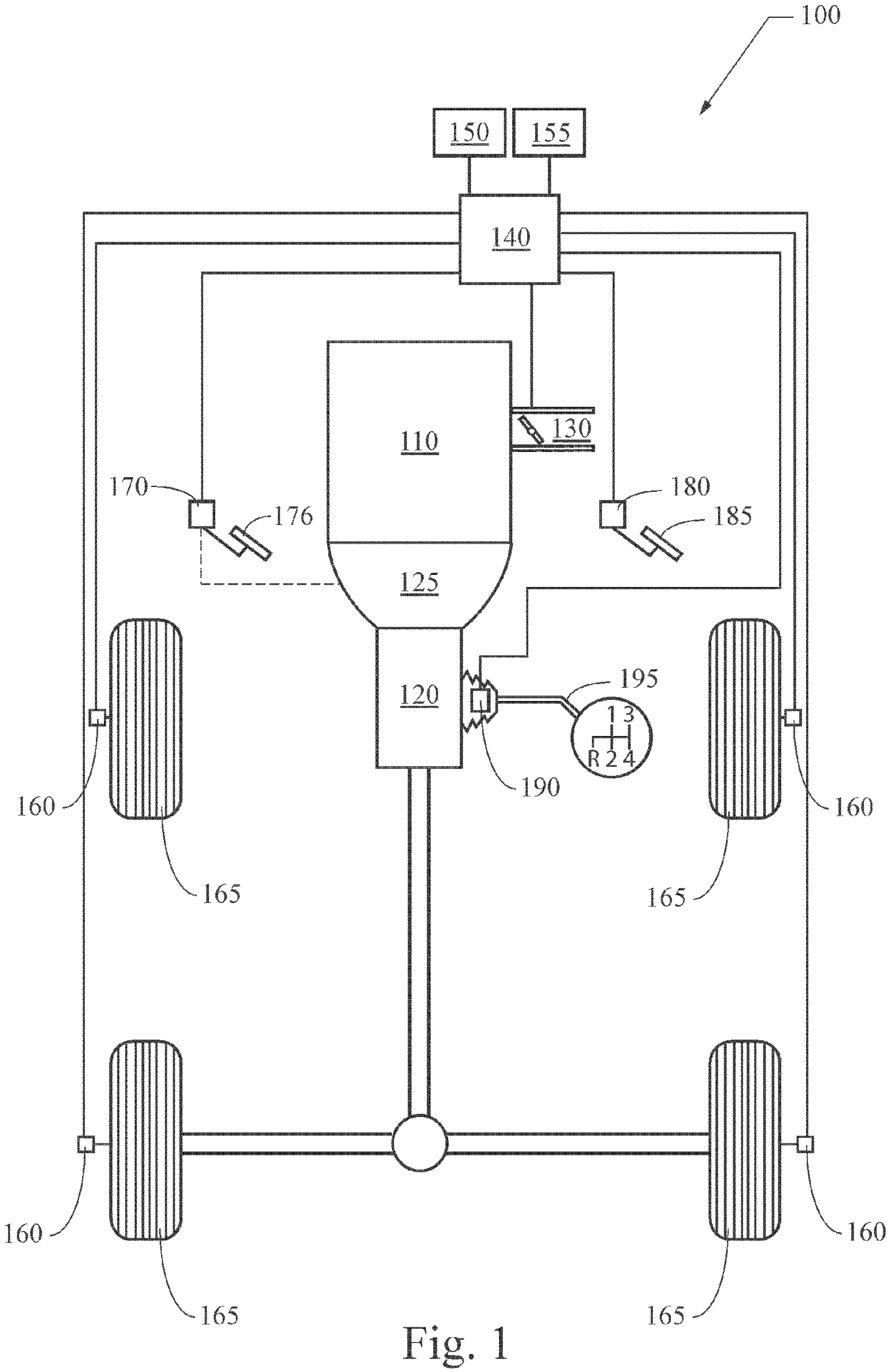
FIG. 1 is a schematic illustration of a manual transmission vehicle implementing a throttle control system according to the principles of the present invention.

Referring now to FIG. 1, an automotive vehicle 100 having an engine 110 coupled to a manual transmission 120 and a clutch 125 is provided. The engine 110 is further coupled to a throttle 130, wherein the throttle is positionable between a fully open position and a fully closed position. The throttle 130 is further coupled to a powertrain control module (PCM) 140, which stores a winter mode throttle map 150 and a base gear throttle map 155, preferably electronically stored therein.

The PCM 140 is also coupled to one or more vehicle speed sensors 160, wherein each vehicle speed sensor 160 is coupled to a wheel 165, and determines the vehicle's speed by well known methods. As one skilled in the art will appreciate, the vehicle speed can be determined in a variety of other ways other than a wheel speed sensor, such as via a GPS device or other electronic means. After the vehicle speed has been determined, the vehicle speed 166 is stored by the PCM 140. As depicted in FIG. 1, four vehicle speed sensors 160 are employed and each is coupled to one of the wheels 165.

The PCM 140 is further coupled to a clutch engagement sensor 170, which may be coupled to either a clutch pedal 176 or the clutch 175 (as designated by the dashed line) and determines a clutch engagement status by detecting the clutch pedal 176 or clutch 175 position. The engaged position of the clutch 175 allows torque to be transferred from the engine 110 to the manual transmission 120, while the disengaged position does not allow torque to be transferred. The clutch engagement sensor 170 provides a clutch engagement signal to the PCM 140, where the clutch engagement status is stored.

The PCM 140 is further coupled to an accelerator position sensor 180. The accelerator position sensor 180 is coupled to an accelerator pedal 185 and detects the position of the accelerator. The accelerator position defines the degree to which the accelerator pedal 185 is being applied by the operator of the vehicle. Accordingly, an accelerator pedal application percentage can range between 100% depressed and 0% depressed. When fully depressed (100%) the clutch is disengaged. After the accelerator position sensor 180 detects the accelerator position, the accelerator position sensor 180 provides an accelerator position signal to the PCM 140, where the accelerator position is stored.

The PCM 140 is further coupled to detect gear position. To this end a gear position sensor 190, wherein the gear position sensor 190 is coupled to the manual transmission 120 or a gear shift lever 195, detects the gear position selected by the operator of the vehicle via the gear shift lever or other means. One skilled in the art will appreciate that the gear position sensor 190 could detect the gear position in a variety of other ways. The gear position defines whether the manual transmission 120 is in first, second, third, fourth, or any other gear. Alternatively, the sensor 190 may only detect if the gear position is second gear. After the gear position sensor 190 detects the gear position, the gear position sensor 190 provides a gear position signal to the PCM 140, where the gear position 196 is stored.

Figure 2:
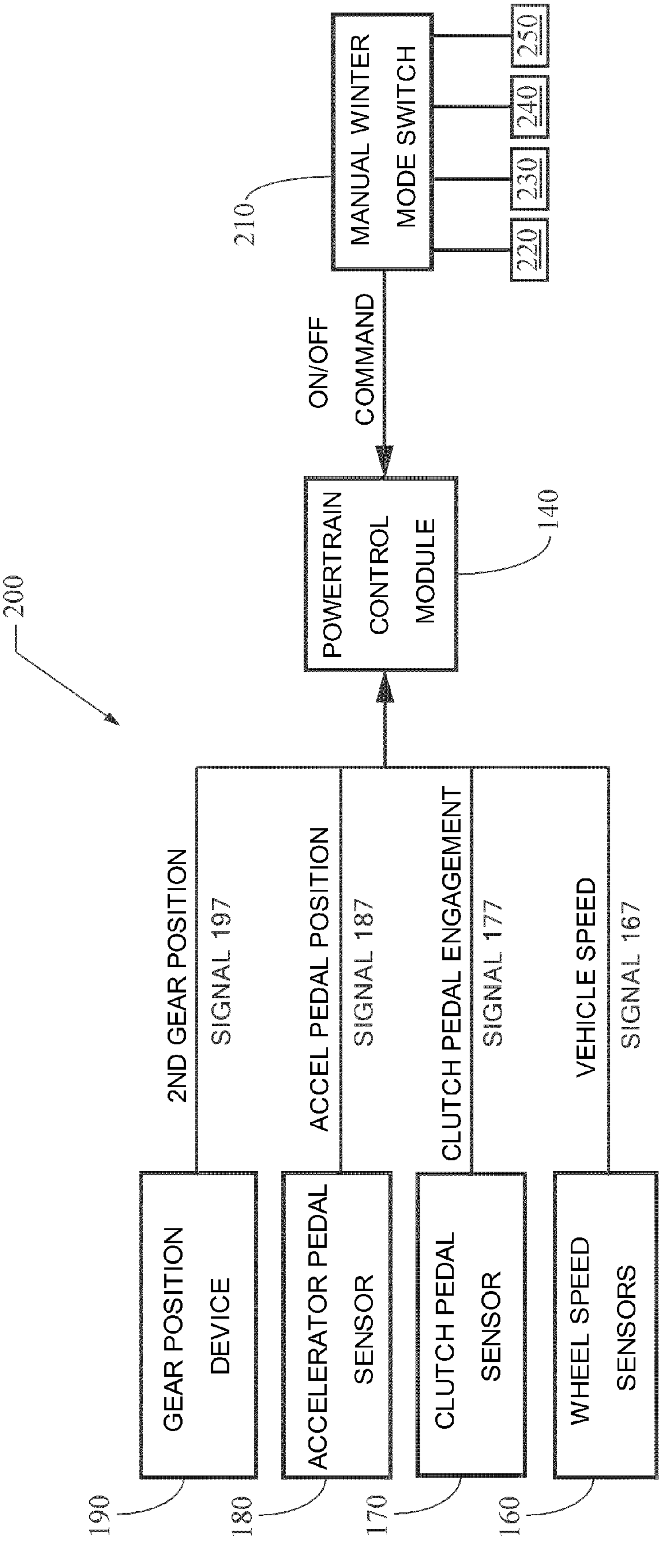
FIG. 2 is a diagram illustration of the throttle control system seen in FIG. 1.

For clarity purposes, the throttle control system 200 is diagrammatically shown in FIG. 2 apart from the automotive vehicle 100.

The PCM 140 is configured to control the throttle 130 via the winter mode throttle map 150 based upon the vehicle speed signal, the clutch engagement signal, the accelerator position signal, and the gear position signal, respectively designated by 167, 177, 187 and 197.

As further discussed below, for the PCM 140 to control the throttle 130 via the winter mode e-throttle map 150, certain conditions must be met. These conditions are designed to ensure that the operator of the vehicle is intending to perform a second gear start operation.

First, the vehicle speed as determined by the vehicle speed signal 167 must indicate that the automotive vehicle 100 is moving at a vehicle speed that is less than a threshold speed. While the threshold speed can be equal to any speed based on the design criteria of the system, it is preferred that this speed is not beyond vehicle speeds normal for second gear operation, and is preferably less than five and, more preferably, less than three miles per hour. Also, the clutch engagement signal 177 must indicate that the clutch 175 is disengaged.

In addition to the above, the accelerator position, as defined by the accelerator position signal 187, must be indicative of the accelerator pedal 185 not being depressed or that the accelerator pedal application percentage is below an accelerator pedal application percentage threshold. The accelerator pedal application percentage threshold can be any percentage based on the design criteria of the system, but is preferably less than 10% and more preferably less than 5% depressed. Finally, the gear position defined by the gear position signal 197 must indicate that the manual transmission 120 is in second gear.

While the occurrence of all four of the above criteria provides a high degree of certainty that the operator intends to perform a second gear start, alternatively, the PCM 140 can control the throttle 130 via the winter mode e-throttle map 150 when a lesser combination of the foregoing conditions is satisfied.

Once operating via the winter mode e-throttle map, the PCM 140 is configured to revert to the base gear throttle map 155 when the vehicle speed exceeds the threshold speed and/or the gear position is changed to a gear other than second gear.

In order to determine whether to even enable the winter mode logic, the automotive vehicle 100 can implement an automatic or operator controlled winter mode switch 210, wherein an ON position enables use of the winter mode logic, and an OFF position disables use of the winter mode logic. Thus, activation and use of the winter mode logic may be fully automatic, automatic with manual override, or fully manual.

When the winter mode switch 210 is turned OFF while the winter mode e-throttle map 150 is in use, the PCM 140 may be configured to control the throttle 130 via the winter mode e-throttle map 150 only until the base gear throttle map 155 is once again called for, upon which it will disable the winter mode logic. In another example, when the winter mode switch 210 is OFF and the winter mode e-throttle map 150 is still in use, the PCM 140 may be configured to deactivate the winter mode logic immediately and begin using the base gear throttle map 155.

When the winter mode switch is OFF and the base gear throttle map 155 is being used, the PCM 140 is configured to continue control of the throttle 130 via the base gear e-throttle map 155.

As noted above, the winter mode switch 210 may be implemented in a variety of ways. In one embodiment, the PCM 140 is coupled to a physical switch 210 that is switchable by the operator of the vehicle 100 and switchable between an ON position and an OFF position. In another example, the automatic winter mode switch 210 is automatic and switches between ON and OFF positions based on other inputs, such that a traction determining device 240 that is configured to detect when the automotive vehicle 100 is in a low traction condition. Such a low traction condition may be the result of temperature, humidity, precipitation, driving surface, driving surface moisture, or any other factors helpful for determining whether low traction conditions exist. These conditions may be sensed by various sensors, including a temperature sensor 220, a moisture sensor 230, or other sensor. If a low traction condition is detected, then the winter mode logic is turned ON by the automatic winter mode switch 210, or if no low traction condition is detected, then the winter mode logic is turned or maintained as OFF. Additionally or alternatively, the traction determining device 240 may itself be part of or separate from a traction control system 250.

Figure 3:
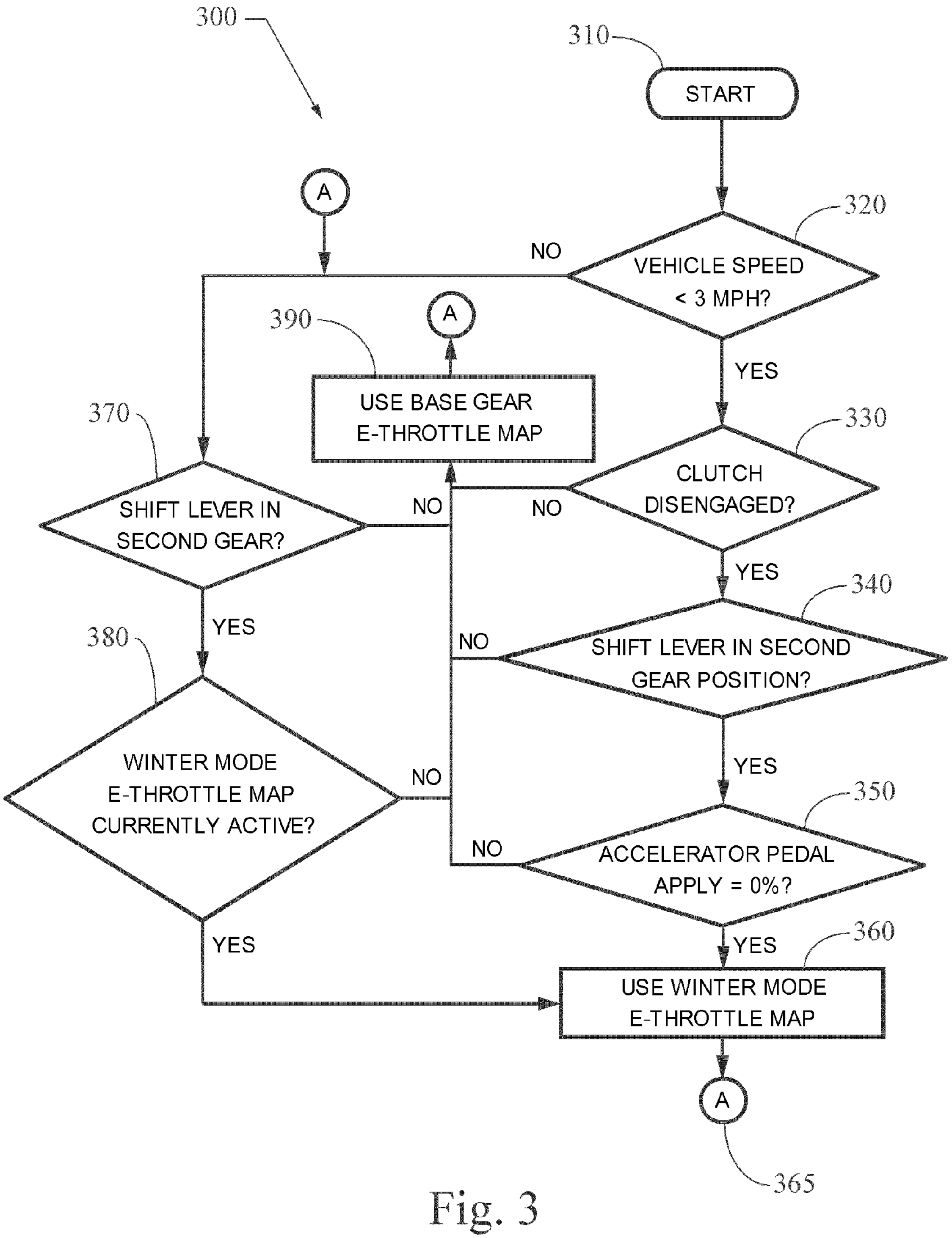
FIG. 3 is a flow chart illustrating a method for implementing throttle control according to the principles of the present invention.
Figure 4:
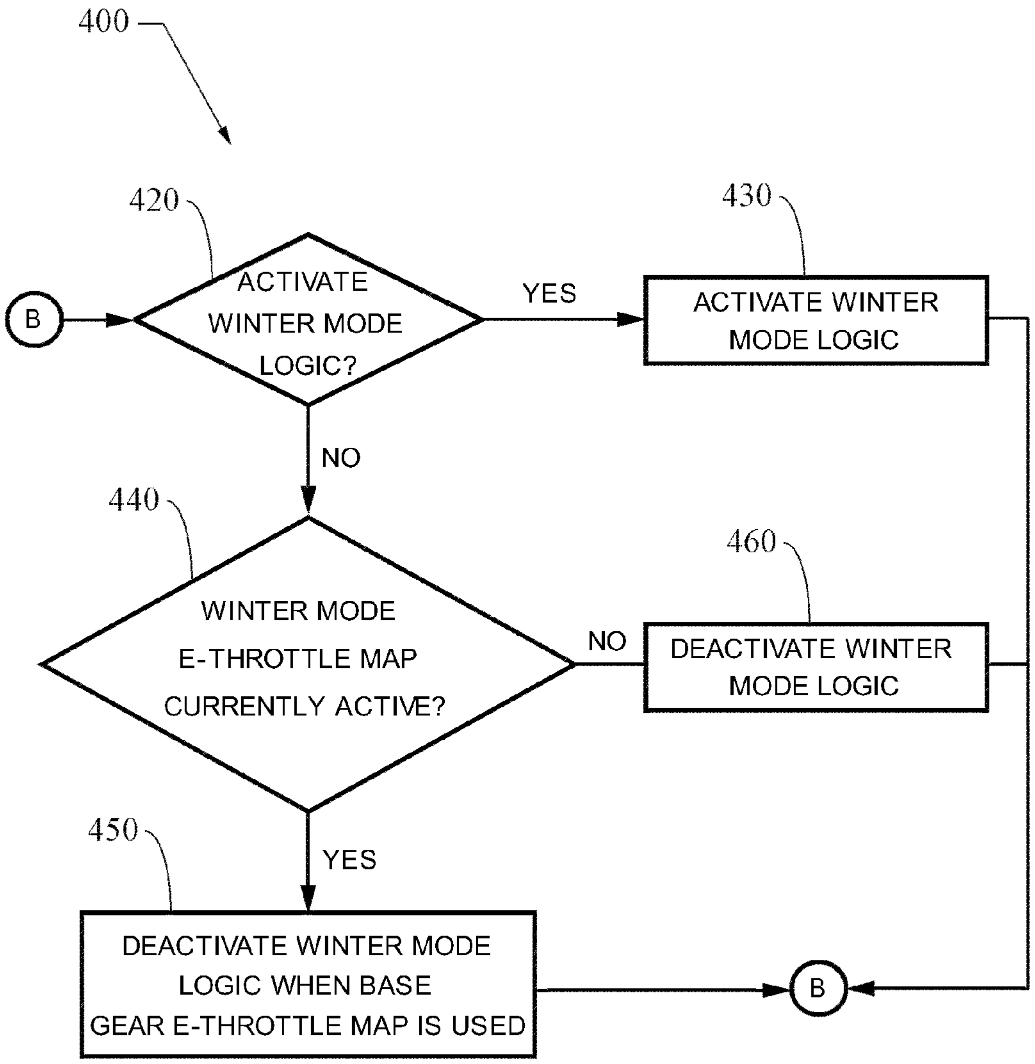
FIG. 4 is a flow chart illustrating a method for activating or deactivating a winter mode logic of the throttle control system.

Referring now to FIGS. 3 and 4, a method of operation 300 of the winter mode logic and a method for activation/deactivation 400 of the winter mode logic are provided. Although for purposes of explanation, these methods are each described as a series of acts, those skilled in the art will appreciate that the claimed subject matter could encompass different orderings, simultaneous occurrences, additions and/or omissions of particular acts.

Referring now to FIG. 4, the method for activation/deactivation 400 of the winter mode logic is detailed therein. The method begins at B and proceeds to block 420. In block 420, the method determines whether the winter mode logic is to be activated or deactivated. As previously noted, this can be achieved in a variety of ways, including use of a manual or automatic winter mode switch 210, the latter of which may include use of a limited traction determining device. If the winter mode switch 210 is ON, then the winter mode logic is to be active and the method proceeds to block 430. In block 430, the winter mode logic is activated by starting the method of operation at block 310 of FIG. 3. The method 400 thereafter returns to B. In block 420, if the winter mode switch is OFF, the deactivation or no activation is desired and the method proceeds to block 440. In block 440, the method determines whether the winter mode e-throttle map is currently active/in use. If the winter mode e-throttle map is currently active/in use, the method proceeds to block 450. In block 450, the method of operation 30 of the winter mode logic 30 (FIG. 3) is set to be deactivate when the base gear e-throttle map is thereafter used (in block 390 of FIG. 3). After the base gear e-throttle map 390 is used, the method 400 proceeds from block 450 to B. Referring back to block 440, if the winter mode e-throttle map is not currently being used, the method immediately proceeds to block 460 and the method of operation 300 of the winter mode logic is deactivated. Thereafter, the method proceeds back to B.

Referring now to FIG. 3, the method of operation 300 of the winter mode logic starts in block 310 and proceeds to block 320 where the method begins to determine if the vehicle operator is intentionally performing a second gear start. In block 320, a vehicle speed is determined. If the vehicle speed is less than a threshold speed, for example 3 miles per hour, then the method proceeds to block 330. Blocks 320, 330, 340 and 350 are intended to conduct this inquiry.

In block 330, the engagement status of the clutch is determined. If the clutch is engaged, it is presumed a second gear start is not being performed and the method proceeds to block 390 and the base gear e-throttle map is used. Thereafter, the method proceeds to A. However, if the clutch is disengaged, the method next proceeds to block 340.

In block 340, the gear position of the transmission is determined, or more specifically, it is determined whether the transmission gear position is in second gear, which may be determined by the sensing location of shift lever. If the gear position is other than second gear (i.e., in first gear), a second gear start is not presumed and the method proceeds to block 390 where the base gear throttle map is used. Thereafter, the method proceeds to A.

If the transmission/gear shift lever 195 is in second gear, the method proceeds to block 350, where the application percentage of the accelerator pedal is determined. If the accelerator pedal is being depressed, (i.e., the application percentage of the accelerator pedal is not 0%), the method presumes a second gear start is not being performed and proceeds to block 390, where the base gear e-throttle map is used. The method thereafter proceeds to A. If the accelerator is not being depressed (i.e., an accelerator application percentage equaling 0%) the method 300 concludes the operator intentionally desires to perform a second gear start, and the method proceeds to block 360, whereafter the winter mode e-throttle map is used to control the throttle opening in response to the subsequent accelerator pedal application percentage. The method thereafter proceeds to A.

Referring back to block 320, if the vehicle speed is initially equal to or greater than the threshold speed (3 miles per hour in FIG. 3), then the method concludes a second gear start is not intended and proceeds to block 370. The method also proceeds to block 370 from A. In block 370, the gear position of the transmission shift lever is determined. If the transmission gear shift lever 195 is not in second gear, the method proceeds to block 390. If the method proceeded from block 360 to A, the e-throttle map is then switched from the winter mode e-throttle map to the base gear e-throttle map. If the method proceeded to A from any other block, the base gear e-throttle map continues to be used. Thereafter, the method proceeds to A. If the transmission gearshift lever 195 is in second gear, the method proceeds to block 380 where the logic determines if the winter mode e-throttle map is currently being used. If the winter mode e-throttle map is currently being used, the logic proceeds to block 360 and continues use of the winter mode e-throttle map. If the winter mode e-throttle map is currently not being used, the logic proceeds to block 390 and the base gear e-throttle map continues to be used.

Figure 5:
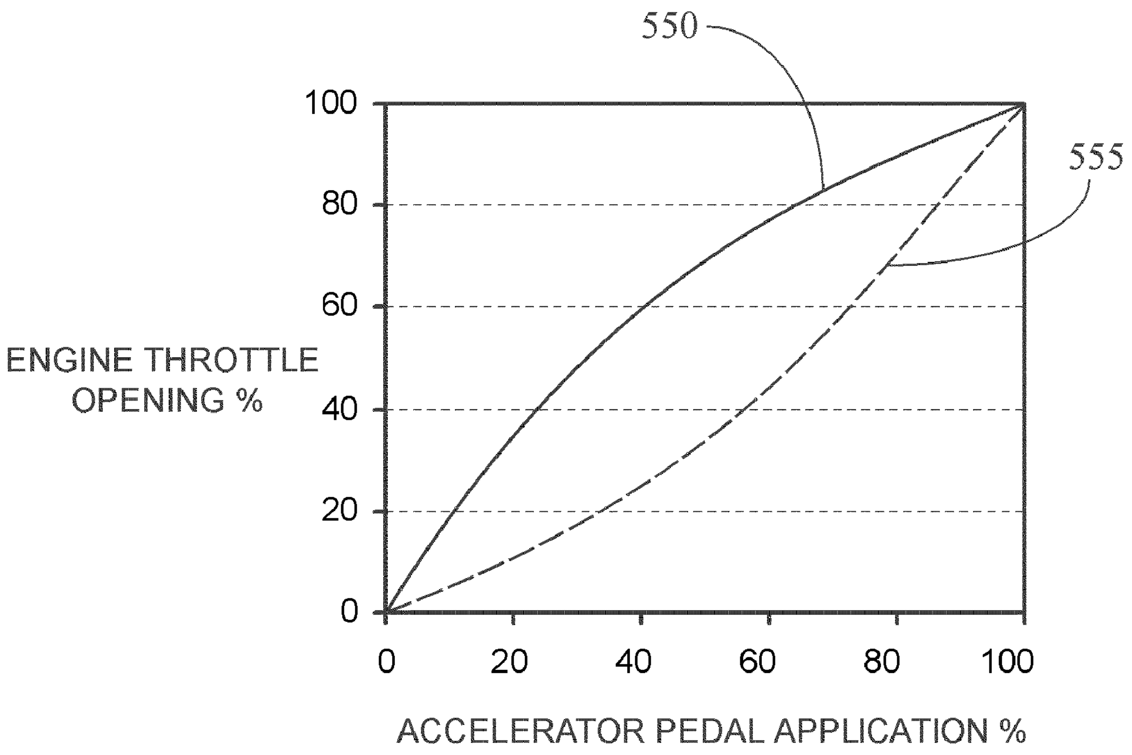
FIG. 5 is a graph illustrating an exemplar winter mode throttle map and an exemplar base gear throttle map.

Referring now to FIG. 5, illustrated therein is a graph providing illustrative examples of a winter mode e-throttle map 550 and a base gear e-throttle map 555. The e-throttle maps 550 and 555 are curves that define the relationship between accelerator pedal application percentage and engine throttle opening percentage. The base gear e-throttle map 555 is used to define the relationship between the accelerator pedal application percentage and the throttle opening. When the winter mode logic is deactivated. The winter mode throttle map 550 defines a relationship between the accelerator pedal application percentage and throttle opening percentage that is different from the relationship defined by the base gear e-throttle map 555. More specifically, for all accelerator pedal application percentages, the winter mode throttle map 550 employs an engine throttle opening percentage that is greater than the engine throttle opening percentage defined by the base gear e-throttle map 555, except at accelerator pedal applications of 0% (closed) and 100% (wide open), where the two maps 550 and 555 are the same. Thus, at all accelerator pedal application percentages between 0% and 100%, while utilizing the winter mode e-throttle map, the engine throttle opening percentage will be greater than that utilized during normal driving. By increasing the engine throttle opening percentage, the accelerator pedal can be depressed (during a second gear start) by the vehicle operator in the same manner as during normal first gear start without potential stalling of the engine as a result of insufficient output torque to overcome the forces acting on the vehicle at rest (road load at a vehicle speed=0). During use of the base gear e-throttle map, the engine throttle opening percentage for a 40% accelerator pedal application percentage is only 25% open. During use of the winter mode e-throttle map, however, it is 60% open. More engine torque is required during the second gear start because of the higher engine output torque required to offset the numerically lower ratio of the second gear ratio, as compared to the first gear ratio.

As one skilled in the art will appreciate various other relationships between accelerator pedal application percentages 510 and throttle opening percentages 520, as defined by the winter mode throttle map 550 and/or the base gear throttle map 555, may be employed. Moreover, the winter mode throttle map 550 and/or base gear throttle map 555 themselves may define relationships between an accelerator pedal application percentage the throttle opening percentage that are linear, nonlinear, exponential, hyperbolic, parabolic, logarithmic functions, or other mathematical functions.

As a person skilled in the art will readily appreciate, the above description is meant as an illustration of the principles of this application. This description is not intended to limit the scope or application of the invention, in that the invention is susceptible to modification, variation and change, without departing from spirit of the invention, as defined in the following claims.

I claim:

1. A method for controlling a throttle during a non-first gear start in a manual transmission vehicle, the method comprising the steps of:

storing a base gear e-throttle map in a control module of the vehicle; the base gear e-throttle map defining a first relationship between an accelerator pedal application percentage and a throttle opening percentage;

storing a winter mode e-throttle map in the control module of the vehicle; the winter mode e-throttle map defining a second relationship between an accelerator pedal application percentage and a engine throttle opening percentage, the winter mode e-throttle map being different than the base gear e-throttle map;

determining a second gear start condition; and opening the throttle of the vehicle in response to accelerator pedal position, the opening of the throttle being based upon the second relationship defined by the winter mode e-throttle map.

2. The method of claim 1 wherein the determining step detects transmission gear position.

3. The method of claim 1 wherein the determining step includes the step of manually placing the transmission of the vehicle in second gear.

4. The method of claim 1 wherein the determining step detects speed of the vehicle.

5. The method of claim 1 wherein the determining step detects accelerator pedal application percentage.

6. The method of claim 1 wherein the determining step detects clutch position of the vehicle.

7. The method of claim 1 wherein the determining step detects a transmission gear position of the vehicle as being in second gear, and at least one of a vehicle speed being lower than a threshold value, an accelerator pedal application position being equal to zero, and a clutch engagement status as being disengaged.

8. The method of claim 1, further comprising a step of sensing low traction conditions and switching from a base driving mode to a winter driving mode in response thereto, the sensing step being performed at least in part by a traction control system.

9. The method of claim 8 wherein the step of sensing low traction conditions senses ambient temperature outside of the vehicle.

10. The method of claim 8 wherein the step of sensing low traction conditions senses moisture outside of the vehicle.

11. The method of claim 1 wherein the opening the throttle switches from being based upon the second relationship defined by the winter mode e-throttle map to being based upon the first relationship defined by the base gear e-throttle map.

12. The method of claim 11 wherein the opening the throttle switches from being based upon the second relationship defined by the winter mode e-throttle map to being based on the first relationship defined by the base gear e-throttle map upon detection of the transmission gear position being in a gear other than second gear.

13. The method of claim 11 wherein the opening the throttle switches from being based upon the second relationship defined by the winter mode e-throttle map to being based on the first relationship defined by the base gear e-throttle map upon a winter mode switch being moved to an OFF position, wherein the winter mode switch is switchable between an ON position and the OFF position.

14. The method of claim 1, wherein the winter mode e-throttle map defines a engine throttle opening percentage that is greater than a base gear e-throttle opening percentage defined by the base gear throttle map for a common accelerator pedal application percentage.

15. A throttle control system in an automotive vehicle, comprising:

an engine coupled to a manual transmission;

a throttle coupled to the engine and being moveable between a fully open position and a fully closed position;

a powertrain control module (PCM) coupled to the throttle and configured to control movement of the throttle between the fully open position and the fully closed position;

the PCM having stored in memory a base gear e-throttle map, the base gear e-throttle map defining a first relationship between an accelerator pedal application percentage and a throttle opening percentage, the PCM also having stored in memory a winter mode e-throttle map, the winter mode e-throttle map defining a second relationship between an accelerator pedal application percentage and a engine throttle opening percentage, the winter mode e-throttle map being different than the base gear e-throttle map; and the PCM being configured to determine existence of a second gear start condition and being further configured to control the throttle via the winter mode throttle map based upon a determination of the existence of the second gear start condition.

16. The system of claim 15 further comprising a vehicle speed sensor coupled to the PCM and configured to provide a vehicle speed signal to the PCM, the PCM being configured to determine existence of the second gear start condition based at least in part on the vehicle speed signal.

17. The system of claim 15 further comprising a clutch engagement sensor coupled to the PCM and configured to provide a clutch engagement signal to the PCM, the PCM being configured to determine existence of the second gear start condition based at least in part on the clutch engagement signal.

18. The system of claim 15 further comprising an accelerator position sensor coupled to the PCM and configured to provide an accelerator position signal to the PCM, the PCM being configured to determine existence of the second gear start condition based at least in part on the accelerator position signal.

19. The system of claim 15 further comprising a gear position sensor coupled to the PCM and configured to provide a gear position signal to the PCM, the PCM being configured to determine existence of the second gear start condition based at least in part on the gear position signal.

20. The throttle control system of claim 15, further comprising a manual winter mode switch coupled to the PCM and moveable between ON and OFF positions, the PCM being configured to control the throttle via the winter mode throttle map only when the manual winter mode switch is in the ON position.

21. The throttle control system of claim 15, further comprising a limited traction determining device coupled to the PCM, the limited traction determining device being configured to detect when the automotive vehicle is in a low traction condition, the PCM being configured to control the throttle via the winter mode throttle map only when the limited traction determining device detects a low traction condition.

22. The throttle control system of claim 21, wherein the limited traction detecting device includes at least one of a temperature sensor and a moisture sensor.

* * * * *